Feb. 14, 1933.   W. H. FREE   1,897,723
REFRIGERATING DEVICE
Filed April 29, 1927

INVENTOR
Walter H. Free.

Patented Feb. 14, 1933

1,897,723

UNITED STATES PATENT OFFICE

WALTER H. FREE, OF NEW ROCHELLE, NEW YORK

REFRIGERATING DEVICE

Application filed April 29, 1927. Serial No. 187,562.

This invention relates to refrigerating devices, and has particular reference to a means for cooling liquids, foods and the like in relatively small quantities such as those prepared for immediate consumption. A particular advantage of the device of the present invention is the provision of a substitute for the ice commonly used in small quantities such as for cooling beverages, for example. It is frequently impossible or impracticable to obtain ice or other cooling means when it is desired to prepare a beverage, or it may not be immediately convenient to procure ice or the like. Furthermore, ice melts rapidly and cannot be kept for very long periods of time nor transported for appreciable distances without requiring special preparation in the way of heat insulation and a bulky container therefor. Among other objections to the use of ice are the dilution of the liquids and foods caused by the melting of ice immersed therein, and the inconvenience experienced in the handling of ice, which requires a relatively large storage container like an ice box, is disagreeable to handle and is otherwise objectionable in many ways.

It is the principal object of this invention to obviate these objections by providing a refrigerating device which is wholly inert when not in use, but which may be instantly converted into an active refrigerating agent whenever desired. This device may be kept for any length of time under any circumstances, and may be transported for any distance without deterioration in any way, and is always ready for use whenever desired. Such a device may be of any form, size, or shape to meet various conditions of use, and will have particular advantage when provided in the form of a capsule which may be immersed in or placed adjacent to a food or beverage for cooling the same. Therefore, the capsule form will be described as the principal embodiment of the invention, although it is to be understood that the invention is susceptible of many uses and advantages not mentioned herein. Other instances of use for the device, in addition to the cooling of beverages and foods, may be for freezing small quantities of ice for table use, or as a substitute or the ice bags commonly used for the external treatment of certain sicknesses and diseases, etc., in combination with suitable accompanying apparatus such as brine reservoirs or the like in convenient forms.

These capsules contain the refrigerating material or materials in an inert state when not in use, and these materials are so prepared that they may be instantly made active by the user to produce the refrigerating effect at the immediate time that refrigeration is desired, and merely by means of a single simple operation. Accordingly, a supply of these capsules may be conveniently carried and kept on hand under all circumstances, and are particularly advantageous when ice or other cooling means are unobtainable or impracticable to provide. They will be found to be useful even where ice or other cooling agents are readily obtainable, as they are more convenient and more easily prepared than ice and have a greater relative cooling effect for the same volume and under the same circumstances of use. Inasmuch as the refrigerating material is permanently contained in the capsule during and after use as well as before, there can be no pollution or dilution of the substance being cooled. One form of the device of this invention is adapted to be used once and be thereafter discarded, but in other forms the refrigerating material may be replenished or renewed or may be maintained in an active state as long as the conditions of use allow or require. Such refrigerating devices are efficient and inexpensive to make and to use and are exceptionally convenient for all purposes of immediate refrigeration of relatively small quantities of any substance.

A better understanding of the invention may be had by reference to the accompanying drawing, in which Figs. 1, 2 and 3 illustrate embodiments of the invention in the form of relatively small capsules adapted to be immersed in or placed adjacent to substances to be cooled;

Figure 1:
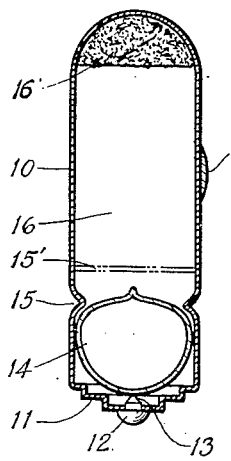

Referring to Fig. 1 of the drawing, numeral 10 designates the capsule shell which may be of any suitable material, and in this instance metal is preferred inasmuch as one end 11 of the shell 10 is adapted to be made flexible or soft and may be provided with corrugations for that purpose. The tip 12 mounted in end 11 terminates in a sharp 13 projecting into the interior of the shell which is adapted to engage the surface of a frangible ampule or cartridge 14 securely held in position within the shell 10 by any suitable means such as the interior bead 15. Cartridge 14 contains the material or one of the materials which upon liberation produce the refrigerating effect, and may be of glass, or any other brittle material which may be shattered, broken or otherwise readily rupturable at any point on its surface. For example, if the wall of cartridge 14 is glass, it will be readily broken by impact, such as when the tip 12 of the capsule is smartly tapped, thereby causing point 13 to break the cartridge and liberate the contents thereof. The material of which cartridge 14 is made depends upon the chemical nature and physical state of the material contained therein, especially as regards pressures, for which purpose glass of suitable thickness is preferable.

The refrigerating materials may be one or more of several different kinds in various physical and chemical states, which, upon mere liberation, or mixture with other materials, produce the refrigerating effect. One example of a chemical refrigerating mixture consisting of two initially separate compounds which, when brought together, produce cold, are a mixture of sodium phosphate with ammonium nitrate in a dry state, and nitric acid. The acid may be initially contained in cartridge 14, while the dry ingredients are contained in the remaining space 16 of the capsule shell 10. Other mixture of chemicals producing refrigeration may be employed either in solid-liquid, solid-gaseous or liquid-gaseous combinations as well as mixtures of suitable gases with gases or liquids with liquids.

A more intense refrigeration effect may be obtained by enclosing in cartridge 14 one of the so-called refrigerants such as ammonia, sulphur dioxide, carbon dioxide, ethyl or methyl chloride, and the like. These gases may be in liquefied, semi-liquefied or highly compressed gaseous form, depending upon the conditions and requirements of use. The capsule shell 10 is hermetically sealed and, in addition to the cartridge 14, it may contain air at atmospheric pressure, a light inert gas such as hydrogen or the like to slightly retard diffusion of the refrigerant vapors, an active gas, liquid or solid which either chemically or mechanically procures or aids refrigeration, or the interior of shell 10 may be partially or wholly exhausted. A vacuum in space 16 will permit a greater expansion of the refrigerant contained in capsule 14 when it is liberated than the presence of other material in space 16 would allow.

Assuming a typical instance by use by way of example, cartridge 14 may contain liquefied ammonia, and a state of vacuum may exist in the interior of shell 10. If refrigeration is required it is only necessary to smartly tap tip 12 of the capsule upon a table or other firm surface to explode cartridge 14 and cause the sudden expansion of the liberated liquid ammonia into space 16 with a consequent absorption of heat from the medium surrounding the capsule. Inasmuch as the increasing vapor pressure within the capsule may retard the free vaporization of any remaining liquefied ammonia, it has been found practicable to provide an absorbent material 16' within the capsule, which, by absorbing the excess ammonia vapor, tends to reduce the vapor pressure and thus increases and prolongs the refrigeration effect by permitting the expansion of the remaining liquid ammonia. This arrangement also reduces the necessary volume of the expansion chamber, and consequently the size of the device, for a given refrigerating effect.

This absorbent material must be of such a character that its absorption of the ammonia vapor is not accompanied by liberation of heat nor should its presence otherwise detract from the refrigerating effect of the ammonia. Such pressure reducing material may be one of several adsorbers such as activated charcoal or prepared silica gel, or absorbers such as copper or ferrous sulphate, sulphuric acid in a suitable vehicle, etc. Sulphuric acid, although efficient as an ammonia absorbent, is not preferred because of its corrosive effect and its instability under certain conditions. While these absorbents have been cited for use with ammonia, there are corresopnding absorbents which may be provided for other refrigerants. Carbon dioxide, however, being harmless, may be allowed to escape through a small opening in the shell 10 after a certain pressure within the capsule is attained, this opening being normally closed with paraffin, wax, thin paper or the like 10', which is punctured when the gas attains a predetermined pressure. The escaping carbon dioxide does not ordinarily harm foods or liquids, and, in the case of liquids having a water base, the gas will partially carbonate the same. Inasmuch as the form of capsule shown in Fig. 1 is intended to be discarded when its refrigerating effect has dissipated, the absorbent therein may be prepared to absorb vapor slowly so that pressures will not build up therein should the capsule become subsequently heated for any reason at all.

Figure 2:
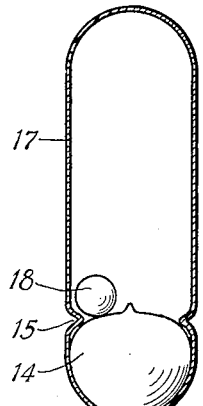

Fig. 2 illustrates another form of refrigerating capsule consisting of shell 17 which is similar to shell 10 except that it is not provided with the flexible or soft end 11, as shown in Fig. 1. Cartridge 14 containing the refrigerating material is similarly held in position in shell 17 by interior bead 15, and is adapted to be shattered or exploded by the impact of heavy ball 18 when the capsule is jerked suddenly or shaken smartly. The liberation of the refrigerant contained in cartridge 14 upon the breaking thereof produces the refrigerating effect in the manner described. If the physical value of the refrigerant contained in cartridge 14 permits of its shell being formed of thin glass or the like, ball 18 may be omitted, as the cartridge 14 may be then readily exploded by smartly tapping that end of the capsule which contains the cartridge upon some firm surface.

Figure 3:
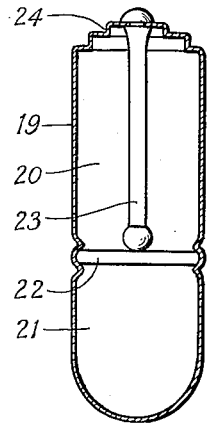

Fig. 3 shows another form of refrigerating capsule, shell 19 of which, instead of being provided with a cartridge containing an active material, is divided into two compartments 20 and 21 by a frangible wall or diaphragm 22. Normally engaging the surface of frangible diaphragm 22 is one end of plunger 23, the other end of which is attached to the flexible or soft end 24, so that by tapping the latter, plunger 23 will break the diaphragm 22 to liberate the materials contained in one or both of compartments 20 and 21. Obviously diaphragm 22 and compartment 21 formed thereby may be replaced by a cartridge such as 14 shown in Figs. 1 and 2, and either space 20 or 21 may contain a liquid, solid, gas, or the like.

Unless some indication is provided on these capsules whereby one which has been used may be distinguished from one which has not been used, they should either be enclosed in a container from which they must be removed for use and to which cannot be returned after use, or some other means must be provided. Whenever feasible, the capsule may be made of glass or other transparent material and contain a slight amount of a chemical indicator such as litmus, phenolphthalein, etc., which will change color when the capsule is used, so that a used capsule may be identified and discarded. In the particular forms of capsules shown in Figs. 1, 2 and 3, the rattle of the glass fragments contained therein will serve to indicate that they have been used.

Other forms of capsules other than those illustrated and described may be provided by making various mechanical substitutions and changes, and it is to be understood that these changes are within the scope of this invention. These capsules may be made of any suitable size and are particularly adaptable to cooling beverages, and for that purpose they may be a size such that they can be readily dropped into a drinking glass, bottle, or other container after being prepared by the user in the manner described. It has been suggested that pellets of so-called carbon-dioxide snow be used to cool liquids and the like as by immersion therein, but this snow becomes coated with a heavy insulating layer of carbon-dioxide gas, so that this snow accordingly exercises less cooling effect upon a liquid than does ordinary water snow, notwithstanding its low temperature. Therefore, carbon-dioxide, if preferred, must be used by the indirect cooling method such as by enclosure in a capsule or other container.

Figure 4:
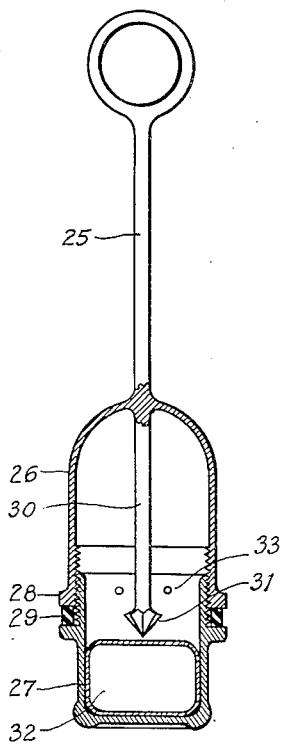
Fig. 4 shows a modified form of the device which may be replenished or renewed when its refrigerating effect has dissipated.

Fig. 4 illustrates a modification of the capsule device above described, in that the refrigerating material may be renewed or replenished. As illustrated, a permanent container in the form of a cylindrical utensil with a handle 25 is provided. The capsule comprises upper and lower portions, 26 and 27 respectively, which are adapted to be screwed together, each being provided with flanges 28 between which is inserted a gasket 29 of compressible material such as soft rubber. The upper portion 26 of the capsule is provided with an interior stem 30 having a sharp tip 31. As the two portions of the capsule are screwed together, gasket 29 is squeezed more tightly between flanges 28 to make an increasingly tighter joint, while tip 31 is gradually advanced until it punctures the capsule 32 and liberates the refrigerant contained therein. Capsules 32 are preferably made of a metal which will be readily punctured by tip 31, and which may be removed from and replaced in the capsule each time the latter is used. The handle 25 is convenient when capsules of this type are immersed in a container. It is not feasible to exhaust or include a gas in the capsule since it is opened frequently for removing and replacing the cartridges, and therefore the refrigerating effect will be somewhat different for the same volume than that of the capsules shown in Figs. 1 to 3. When the refrigerating effect of the capsule has dissipated, portions 26 and 27 may be partly unscrewed to let the gas out of small openings 33 into the atmosphere if the gas is carbon-dioxide or some other non-noxious gas. If the refrigerant is ammonia, the capsule may be immersed in cool water and partly unscrewed so that the ammonia gas escapes from openings 33 to be dissolved in the water. However, for these and other gases, an absorbent cartridge may be placed within the capsule with the refrigerant cartridge 32, or an absorbent cartridge and the refrigerant cartridge may be joined as a unit, as illustrated in Figure 5 as 40—40'.

Figure 5:
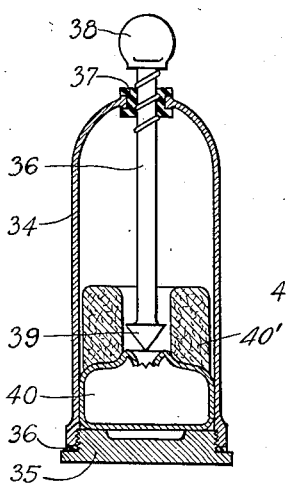
Fig. 5 illustrates another form of device whose refrigerating effect may be controlled and be maintained active as long as conditions of use allow or require.

A somewhat different device is shown in Fig. 5, which has the advantages of renewal or replacement of the form shown in Fig. 4, and, in addition, is so arranged that the refrigerating effect may be controlled and prolonged, depending upon the conditions of usage. This form of device is preferably made larger than those heretofore described, and consists of the shell 34, closed at the bottom by a knurled screw-cap 35 and gasket 36, and having an opening in the top through which passes a plunger 36 threaded through a soft rubber collar or stuffing box 37. The outer end of plunger 36 is provided with a flat turning plate 38, while the inside end thereof is provided with the smooth, conical puncturing tip 39. The cartridge 40 containing the refrigerant is preferably provided with a flat top adapted to be punctured by conical tip 39 as the latter is advanced by turning handle 38. The metal of other material forming the flat top of cartridge 40 should be relatively soft so that tip 39 will seal the breach therein after puncturing. Then by turning handle 38 in the opposite direction, the refrigerant is allowed to expand from the breach in the cartridge until the desired cooling is obtained, when the breach may be again closed by the cone 39. Thus the refrigerating effect may be controlled and the refrigerant be conserved. As pointed out above, an absorbent may be used to relieve excess gas pressure in the capsule 34, or, if a non-noxious refrigerant is used a valve or small opening may be provided in the side of capsule 34 for the same purpose. Instead of puncturing cartridge 40 a valve may be provided therein adapted to be opened by a blunt end provided on plunger 36 instead of cone point 39 and closed by the pressure within the cartridge or by a spring.

The refrigerating capsules shown in Figs. 1 to 3 inclusive may be made renewable in a manner similar to that explained in connection with the Figs. 4 and 5, by making the capsule shell 10, in Fig. 1 for example, in two parts threaded or, bayonet-jointed or otherwise fastened together so that frangible cartridges may be replaced as used. Cartridges 14 and 40 may be distributed as replacement units to replenish the refrigerating capsules of the renewable type described. Furthermore, the refrigeration effect of the device may be retarded or prolonged by providing a porous or single orifice diaphragm adjacent the cartridge through which the refrigerant vapors may more slowly diffuse into the expansion chamber after the refrigerant has been liberated from the cartridge by breakage or the like. Such a diffusion diaphragm 15′ is shown in phantom in Fig. 1.

Figure 6:
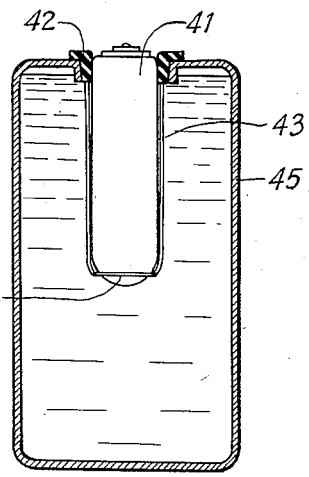
Fig. 6 shows an adaptation of the device of this invention to the cooling of brine or other liquid for various uses where a large, cold area is required and less cold intensity.

In Fig. 6 is shown a device by means of which a larger cold area of less intensity may be obtained by using one of the capsules heretofore described. This capsule 41 is placed in a hollow stopper 42, preferably of flexible material such as rubber, and having a sling or support for the capsule in the way of depending cords or wires 43 attached to a ring 44 in which the base of the capsule rests. The stopper 42 fits tightly in a suitable container 45 so that the capsule 41 is in free contact with a salt brine, alcohol or glycerin solution, or the like contained in container 45. The capsule is then made active by striking its soft tip in the manner described, and accordingly cools the brine or other liquid in container 45. In this way a large cold area may be obtained for cooling receptacles, foods and the like instead of using ice, or by making container 45 of rubber or suitable material, the device may be used as an applicator in the treatment of certain sicknesses to take the place of an ice bag. The container may be provided with trays containing fresh water to be frozen into ice cubes, may be immersed in fresh water to produce ice, and has numerous other uses. A number of capsules 41 may be provided in this way and may be made active successively or at will to increase or prolong the cooling effect of the brine. Obviously, the capsules may be used in successive numbers to cool or keep cool any substance, and the device of this invention is susceptible of many other uses, which may or may not require numerous changes, but it is to be understood that such changes can be made within the scope of the invention as defined by the appended claims.

I claim:

1. A refrigerating device comprising an exhausted container, a cartridge of liquefied refrigerant in the container, and means for breaking the cartridge to expand the refrigerant within said container.

2. A refrigerating device comprising a sealed container, a diffusion diaphragm separating the container into compartments, a normally inert liquefied refrigerant in one of the compartments, and means for rendering the refrigerant active to expand though said diaphragm into the other compartment.

3. A refrigerating device comprising a sealed container, a cartridge of liquefied refrigerant in the container, a cartridge of absorbent material in the container, means for liberating the refrigerant to expand within the container, said absorbent material adapted to absorb the gaseous refrigerant.

4. A refrigerating device comprising a sealed container, a supply of liquefied refrigerant confined in the container, means for liberating the refrigerant to expand within the container, and porous means in the container to reduce the pressure of the expanded refrigerant.

5. A refrigerating device comprising a container, and an ampule of liquefied gaseous refrigerant in said container, said ampule being adapted to be broken by impact on the container to permit the refrigerant to expand within the container whereby a cooling action is produced.

6. A refrigerating device comprising a container having an aperture in the wall thereof, a cartridge of refrigerant in said container and adapted to be opened to liberate the refrigerant into the container for producing a cooling action, and means normally closing the aperture in the wall of said container and openable by a predetermined pressure of the refrigerant in said container to release the same therefrom.

7. A refrigerating unit comprising a shell, a refrigerant sealed therein and adapted to be liberated by opening said shell, and a mass of porous material attached to said shell and adapted to absorb said refrigerant upon liberation from said shell.

8. A refrigerating device comprising a sealed container, a cartridge of liquefied gaseous refrigerating material in the container, means for opening the cartridge to permit the material to expand within the container to produce a cooling action, and means for controlling the expansion of the material within the container.

In testimony whereof I affix my signature.

WALTER H. FREE.